H. C. MIEVILLE.
ROASTER.
APPLICATION FILED AUG. 20, 1921.

1,432,407.

Patented Oct. 17, 1922.
2 SHEETS—SHEET 1.

WITNESSES
BWallace.

INVENTOR
Herbert C. Mieville
BY Winter & Brown
ATTORNEYS

H. C. MIEVILLE.
ROASTER.
APPLICATION FILED AUG. 20, 1921.

1,432,407.

Patented Oct. 17, 1922.
2 SHEETS—SHEET 2.

WITNESSES
D B Wallace.

INVENTOR
Herbert C. Mieville
BY
Winter & Brown
ATTORNEYS

Patented Oct. 17, 1922.

1,432,407

UNITED STATES PATENT OFFICE.

HERBERT C. MIEVILLE, OF NEW YORK, N. Y., ASSIGNOR TO SQUIRE PRODUCTS COMPANY, OF PITTSBURGH, PENNSYLVANIA, A CORPORATION OF DELAWARE.

ROASTER.

Application filed August 20, 1921. Serial No. 493,972.

*To all whom it may concern:*

Be it known that I, HERBERT C. MIEVILLE, a subject of the King of Great Britain, and a resident of New York, in the county of New York and State of New York, have invented a new and useful Improvement in Roasters, of which the following is a specification.

This invention relates to roasters or cookers and particularly to that type employed for roasting meats within a closed container. The objects of the invention are to provide a simple device of the character referred to which may be readily assembled and disassembled, easily cleaned and in which some of the parts comprising the roaster may be used for other purposes when removed.

The special objects of the invention are to provide a roaster in which the meat will be effectively basted during the roasting process without special attention; in which danger of burning or scorching is reduced to a minimum; in which the heat will be evenly distributed to the main receptacle or container; and in which the bails for the several vessels used are held in a position to be readily gripped when desired, and to prevent their becoming excessively hot.

These and other objects of the invention will more readily appear from the following description taken in connection with the appended claims.

Figure 1:
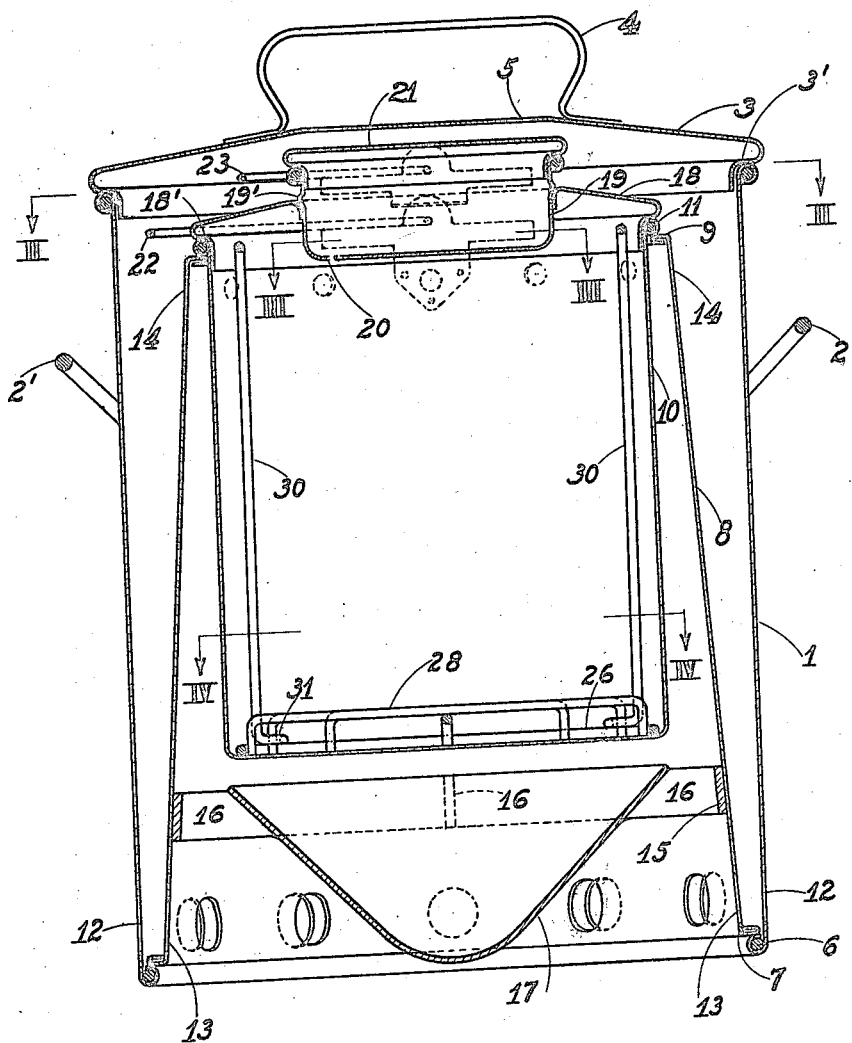
Figure 2:
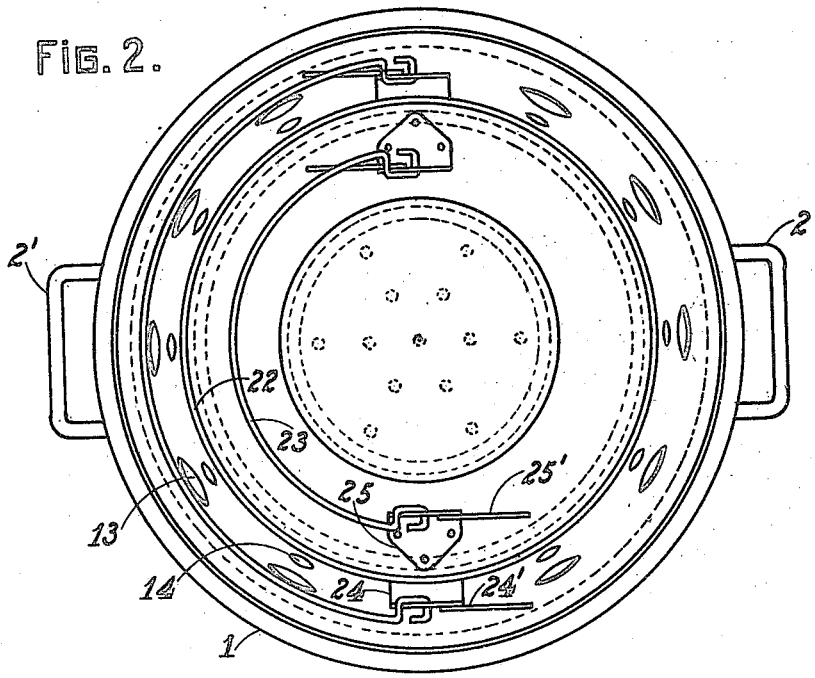
Figure 4:
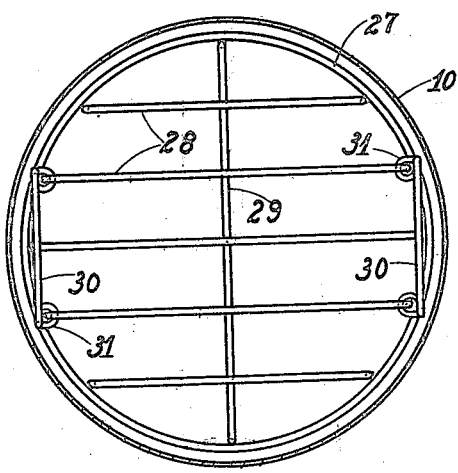
Figure 3:
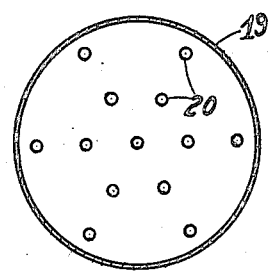

Like reference characters are used to denote corresponding parts throughout the several views of the drawings in which Fig. 1 is a vertical sectional view illustrating an embodiment of the invention; Fig. 2 a plan view of the device shown in Fig. 1 with the cover or closure removed; Fig. 3 a transverse sectional view taken on line III—III of Fig. 1; and Fig. 4 a transverse sectional view taken on the line IV—IV of Fig. 1.

The roaster embodying the invention comprises the outer cylindrical casing 1 provided with the attached handles 2, 2' at its opposite sides and the top 3 having the handle 4. The top 3 contains an annular series of holes 5 at its center and has its peripheral edge turned upon itself to form a supporting flange 3' adapted to seat from the upper edge of cylinder 1. The lower inner edge of the casing is bent around a wire ring 6 to form a supporting rib upon which rests the lower edge 7 of the frusto-conical deflector 8 whose height is somewhat less than the height of casing 1 and which tapers upwardly and terminates in the inturned flange 9 for supporting the main container 10 from a rib 11 similar to the rib 6. Adjacent the lower ends of the casing 1 and deflector 8 are the respective annular series of apertures 12 and 13, and a similar series 14 is formed in the upper edge of the deflector, all of which serve to permit the passage of heat, it being observed that the telescopic arrangement of the casing, the deflector and container, form annular chambers between said elements, the chamber between the deflector 8 and container 10 gradually decreasing in cross section towards its top so as to heat the container evenly throughout its extent regardless of the fact that the intensity of the heat gradually decreases as it ascends.

Attached to the inner surface of the deflector near its lower end in any suitable manner, as by welding, is the spider formed of the ring 15 and arms 16 for positioning a conical deflecting baffle 17 immediately below the container 10, the diameter of the baffle at its upper end corresponding to the diameter of the said container.

The container is equipped with a closure 18 provided with a peripheral flange 18' similar to flange 3' for holding the same in position and has an opening at its central portion in which fits the auxiliary container 19 provided with a peripheral rib 19' for suspending it. The bottom of the auxiliary container 19 is provided with a series of holes 20, the function of which will be subsequently described, and is formed with an overturned upper edge for receiving the lid 21.

The container 10 and the closure 18 have attached thereto bails 22, 23 which are hinged thereto by the apertured ears 24, 25. Extensions 24', 25' are formed on the upper edges of these ears and are adapted to be engaged by the looped ends of the bails to maintain them in horizontal position as clearly illustrated in Figs. 1 and 2 so as to be readily gripped for removing the containers. Such means for positioning the bails keeps them out of contact with the sides of the containers throughout substantially their entire extent, and this prevents their becoming extremely hot.

Positioned within the container 10 is the grid 26 comprising a ring 27 to which are attached by any suitable means, as by welding, the transverse bars 28 and 29. At opposite sides, the grid is provided with handles 30 which are attached to the transverse bars 28 by bending their ends around the same in a well known manner as indicated at 31, said handles extending to a point just below the closure 18.

It will be observed that the casing 1, the deflector 8, the two containers, the grid and the several closures are all telescopically arranged and removably supported within each other. This renders the device readily assembled or disassembled and when disassembled, each portion can be easily and thoroughly cleaned, and due to the fact that each part is separate from the other, the several containers may be used individually if desired. It is also noted that the lid 21 for the auxiliary container is made of such size as to fill the opening in the closure 18 and is intended to be placed in said opening to replace the auxiliary container when it is not necessary or desirable to use the same.

In use, the several parts are assembled as shown in Fig. 1, the meat to be roasted being supported within the container 10 upon the grid 26 and suet or fat being placed in the auxiliary container 19. The device is placed over an ordinary burner or other source of heat and the heat rises in the compartment between the container 10 and deflector 8, being deflected by the baffle 17 outwardly toward said deflector and as it rises within the gradually decreasing space therebetween uniformly heats the container throughout its entire extent.

The heated gases escape through the openings 14 after which they pass upwardly over the closure 18 and auxiliary container 19, finally passing out through the openings 5 in closure 3. Some of the heat deflected by the baffle 17 finds its way through openings 13, and heat may also enter through apertures 12, to the space between the deflector 8 and casing 1, in which case it passes upwardly uniting with that from the openings 14 and escapes as previously described.

During the cooking process, the suet or fat in the auxiliary container gradually drips through the holes 20 upon the meat within the main container and effectively bastes and seasons the same, thus eliminating this tedious operation usually performed by hand and requiring constant attention. In case basting is not desired, the auxiliary container may be used for cooking some other article, or may be removed entirely and replaced by its cover or lid 21 as previously described.

I claim:

1. A roaster comprising an outer casing, an inner deflecting casing removably supported within said outer casing, a container removably suspended within the deflecting casing, the said casing and container being spaced from each other to provide annular chambers therebetween, the said chamber between the container and deflecting casing gradually decreasing in cross section towards its upper part.

2. A roaster comprising an outer casing, an inner deflecting casing removably supported within said outer casing, a main container removably supported within the deflecting casing, a closure for said main container provided with an auxiliary container, the said casings and main container being spaced from each other to provide annular chambers therebetween, the said chamber between the main container and deflecting casing gradually decreasing in cross section towards its upper part.

3. A roaster comprising an outer casing, an inner tapered deflector removably supported within said outer casing, a container removably suspended within the deflector, closures for said casing and container, a deflecting baffle spaced from but supported by said deflector immediately below said container, the said deflector and container being spaced apart to provide an annular chamber gradually decreasing in cross section towards its upper part.

4. A roaster comprising a cylindrical casing, a closure therefor, a frusto-conical deflector supported at its lower end within the casing and having an inturned flange at its upper end, a container having an enlargement at its upper end resting upon the said flange for removably suspending the same within the deflector, a cover for said container provided with an opening, and an auxiliary container provided with a rib for removably supporting it within the said opening.

5. A roaster comprising a cylindrical casing, an apertured closure therefor, a frusto-conical deflector removably supported at its lower end within the casing and having an inturned flange at its upper end, a container having an enlargement at its upper end resting upon the said flange for removably suspending the same within the deflector, a grid within the container, a cover for said container provided with an opening, an auxiliary container provided with a rib for removably supporting it within the said opening, and a conical deflecting baffle supported by said deflector and positioned below said container.

6. A roaster comprising a cylindrical casing, a closure therefor, a frusto-conical deflector supported at its lower end within the casing and having an inturned flange at its upper end, both said casing and deflector being provided with a series of apertures adjacent their lower ends and the deflector being also provided with a series of apertures near its upper end, a container having an enlargement at its upper end resting upon the said flange for removably suspending the same within the deflector, a cover for said container provided with an opening, and an auxiliary container provided with a rib for removably supporting it within the said opening.

7. A roaster comprising a cylindrical casing, a closure therefor, a frusto-conical deflector supported at its lower end within the casing and having an inturned flange at its upper end, a container having an enlargement at its upper end resting upon the said flange for removably suspending the same within the deflector, a bail for said container, a cover for said container provided with an opening, an auxiliary container provided with means for removably supporting it within said opening, and a bail for said cover, both said bails being held in substantially horizontal position and out of contact with the sides of the containers.

In testimony whereof, I sign my name.

HERBERT C. MIEVILLE.

Witness:
W. C. MEYER.